US 8,077,958 B2

(12) United States Patent
Qian et al.

(10) Patent No.: US 8,077,958 B2
(45) Date of Patent: Dec. 13, 2011

(54) COMPUTER-AIDED PATHOLOGICAL DIAGNOSIS SYSTEM

(75) Inventors: Wei Qian, Wesley Chapel, FL (US);
Dansheng Song, Tampa, FL (US);
Tatyana A. Zhukov, Lutz, FL (US)

(73) Assignee: University of South Florida, Tampa, FL (US)

( * ) Notice: Subject to any disclaimer, the term of this patent is extended or adjusted under 35 U.S.C. 154(b) by 1059 days.

(21) Appl. No.: 11/772,288

(22) Filed: Jul. 2, 2007

(65) Prior Publication Data
US 2008/0166035 A1 Jul. 10, 2008

Related U.S. Application Data

(60) Provisional application No. 60/806,372, filed on Jun. 30, 2006.

(51) Int. Cl.
*G06K 9/00* (2006.01)
(52) U.S. Cl. ......... 382/133; 382/100; 382/128; 382/134
(58) Field of Classification Search .................. 382/155, 382/162, 168, 173
See application file for complete search history.

(56) References Cited

U.S. PATENT DOCUMENTS

| | | | |
|---|---|---|---|
| 5,299,269 A * | 3/1994 | Gaborski et al. | 382/156 |
| 6,728,405 B1 * | 4/2004 | Kazato et al. | 382/190 |
| 7,761,240 B2 | 7/2010 | Saidi et al. | |
| 2003/0184730 A1 * | 10/2003 | Price | 356/39 |
| 2003/0194115 A1 * | 10/2003 | Kaufhold et al. | 382/128 |
| 2005/0266395 A1 * | 12/2005 | Gholap et al. | 435/4 |
| 2006/0036372 A1 | 2/2006 | Yener et al. | |
| 2006/0045323 A1 * | 3/2006 | Ateya | 382/141 |
| 2006/0280364 A1 * | 12/2006 | Ma et al. | 382/173 |
| 2007/0099219 A1 * | 5/2007 | Teverovskiy et al. | 435/6 |
| 2007/0250129 A1 * | 10/2007 | Van Oort | 607/28 |

OTHER PUBLICATIONS

Sammouda et al, "Cancerous nuclei detection on digitized pathological lung color image", Journal of Biomedical Informatics 35, 92-98, 2002.*
Qian et al (Image feature extraction for mass detection in digital mammography: influence of wavelet analysis, Med Phys Mar. 1999).*
Qian W et al, "Fragmentary Window Filtering for Multiscale Lung Nodule Detection: Preliminary Study," Academic Radiology, Apr. 1998.*
Ward,I.M. & Chen, J. "Histone H2AX is phosphorylated in an ATR-dependent manner in response to replicational stress." J. Biol. Chem. 276, 47759-47762, 2001.
Mouroutis, T, Roberts, SJ, Bharath, A. A. "Robust cell nuclei segmentation using statistical modeling." Bio. Imaging 1998; 6:79-91.
Simon, I., Pound, C. R., Partin, A. W., Clemens, J. Q., and Christenbarry, W. A. "Automated image analysis system for detecting boundaries of live prostate cancer cells." Cytometry 1998; 31:287-94.

(Continued)

*Primary Examiner* — Jingge Wu
*Assistant Examiner* — Avinash J Yentrapati
(74) *Attorney, Agent, or Firm* — Molly L. Sauter; Courtney M. Dunn; Smith & Hopen, P.A.

(57) ABSTRACT

The present invention is a computer-aided pathological diagnosis method for the classification of cancer cells in a tissue specimen based on a digital cellular image of the tissue specimen. The method of the present invention includes the steps of, extracting the histological characteristic features of the cellular image using preprocessing algorithms having adaptive strategies to enhance the cellular image, declustering the extracted histological characteristic features of the cellular image to isolate the individual cells and the nuclei inside the cells, segmenting the declustered cellular image, labeling the segmented cellular image and classifying the cells in the labeled cellular image as cancer cells or non-cancer cells.

28 Claims, 10 Drawing Sheets

OTHER PUBLICATIONS

Wu, H. S., Barba, J., and Gil, J. "Iterative thresholding for segmentation of cells from noisy images." J Microsc 2000; 197:296-304.

Theocharis, S., Kanelli, H., Politi, E., et al. "Expression of peroxisome proliferator activated receptor-gamma in non-small cell lung carcinoma: correlation with histological type and grade." Lung Cancer (Lung cancer (Amsterdam, Netherlands)) 2002; 36(3): 249-55.

Zhou, Z. H., Jiang, Y., Yang, Y. B., et al. "Lung cancer cell identification based on artificial neural network ensembles." Artif Intell Med (Artificial intelligence in medicine.) 2002; 24(1): 25-36.

Bergqvist M; Brattström D; Larsson A, and others. "The role of circulating anti-p53 antibodies in patients with advanced non-small cell lung cancer and their correlation to clinical parameters and survival." BMC Cancer (BMC cancer [electronic resource].) 2004; 4(1): 66.

W. Qian, L. P. Clarke, M. Kallergi, and R. A. Clark. "Tree-structured nonlinear filters in digital mammography," IEEE Trans. Med. Imag., vol. 13(1), 25-36, 1994.

W. Qian, M. Kallergi and L. P. Clarke. "Order Statistic-Neural Network Hybrid Filters for Gamma Camera Image Restoration." IEEE Trans. in Medical Imaging, pp. 56-65, Mar. 1993.

W. Qian, and L. P. Clarke. "Wavelet-based neural network with fuzzy-logic adaptivity for nuclear image restoration," Proceedings of the IEEE, Special Issue on Applications of Neural Networks, Invited paper, vol. 84, No. 10, 1996.

B. Y. Zheng, W. Qian, and L. P. Clarke. "Digital mammography: MF-based NN for automatic detection of microcalcifications," IEEE Trans. on Medical Imaging, pp. 589-597, Oct. 1996.

Qian, W., Li, L., and Clarke, L. P. 1998. "Image Feature Extraction for Mass Detection in Digital Mammography: Influence of Wavelet Analysis." Am. Assoc. Phys. Med. vol. 26 pp. 402-408.

Qian, W., Sun, A., Song, D., and Clark, R. A. 2001. "Digital Mammography: Wavelet Transform and Kalman-Filtering Neural Network in Mass Segmentation and Detection." Academic Radiology, vol. 8, No. 11, pp. 1074-1082.

Zajac, A., Song, D., and Zhukov, T. 2007. Protein Microarrays and Quantum Dot Probes for Early Cancer Detection. Colloids and Surfaces. 58 (2). pp. 309-314.

Qian, W., Clarke, L. P., Zheng, B., Kallergi, M., and Clark, R. 1995. "Computer Assisted Diagnosis for Digital Mammography." IEEE Engineering in Medicine and Biology. Sep./Oct. 1995 issue. pp. 561-569.

Qian, W., Zhukov, T., Song, D., and Tockman, M. S. 2007. Computerized Analysis of Cellular Features and Biomarkers for Cytologic Diagnosis of Early Lung Cancer. Analytical and Quantitative Cytology and Histology. vol. 29, No. 2/Apr. 2007. pp. 103-111.

Yang, F.; Jiang, T. 2001. Cell Image Segmentation with Kernel-Based Dynamic Clustering and an Ellipsoidal Cell Shape Model. Journal of Biomedical Informatics. 34: 67-73.

Arman, F.; Pearce, J.A. 1990. Unsupervised Classification of Cell Images Using Pyramid Node Linking. IEEE Transactions on Biomedical Engineering. 37: 647-650.

Jiang, T.; Yang, F. 2002. An Evolutionary Tabu Search for Cell Image Segmentation. IEEE Transactions on Systems, Man, and Cybernetics—Part B: Cybernetics. 32: 675-678.

Comaniciu, D.; Meer, P. 2002. Mean Shift: A Robust Approach Toward Feature Space Analysis. IEEE Transactions on Pattern Analysis and Machine Intelligence. 24: 603-619.

Thiran, J. 1996. Morphological Feature Extraction for the Classification of Digital Images of Cancerous Tissues. IEEE Transactions on Biomedical Engineering. 43: 1011-1020.

Beil, M.; Irinopoulou, T.; Vassy, J.; Wolf, G. 1995. A dual approach to structural texture analysis in microscopic cell images. Computer Methods and Programs in Biomedicine. 48: 211-219.

Dillon, D.A.; Howe, C. L; Bosari, S.; Costa, J. "The Molecular Biology of Breast Cancer: Accelerating Clinical Applications." Critical Reviews in Oncogenesis. 1998; 9(2):125-140.

Burma, S.; Chen, B.P.; Murphy, M.; Kurimasa, A. and Chen, D.J. "ATM phosphorylates histone H2AX in response to DNA double-strand breaks". J. Biol. Chem. Nov. 9, 2001; 276(45):42462-42467.

Sedelnikova, O.A.; Pilch, D.R.; Redon, C.; Bonner, W.M. "Histone H2AX in DNA damage and repair." Cancer Biol Ther. May/Jun. 2003; 2(3):233-235, 2003.

Kayser, K.; Kayser, G.; Bovin, N.V.; Gabius, H. J. "Quantitative evaluation of ligandohistochemistry with cytoplasmatic markers: program structure and application to lung carcinomas." Electronic journal of pathology and histology. 1995;1(4).

Garrido, A.; Perez De La Blanca, N. "Applying deformable templates for cell image segmentation." Pattern Recognit 2000; 33:821-32.

Wu, H.S.; Barba, J.; Gil, J. "A parametric fitting algorithm for segmentation of cell images." IEEE Trans Biomed Eng Mar. 1998; 45(3):400-7.

Kapur, J.N.; Sahoo, P.K.; Wong, A.K.C. "A new method for gray-level picture thresholding using the entropy of the histogram." Comput Vis Graph Image Process 1985; 29:273-85.

Kittler, J.; Illingworth, J. "Minimum error thresholding." Pattern Recognit 1986;19(1):41-47.

Hamasaki, M.; Kamma, H.; Wu, W.; Kaneko, S.; Fujiwara, M.; Satoh, H.; Haraoka, S.; Kikuchi, M.; Shirakusa, T. "Expression of hnRNP B1 in four major histological types of lung cancers." Anticancer Res. 2001; 21 (2A): 979-84.

Yamaji, H.; Iizasa, T.; Koh, E.; Suzuki, M.; Otsuji, M.; Chang, H.; Motohashi, S.; Yokoi, S.; Hiroshima, K.; Tagawa, M.; Nakayama, T.; Fujisawa, T. "Correlation between interleukin 6 production and tumor proliferation in non-small cell lung cancer." Cancer Immunol Immunother (Cancer immunology, immunotherapy : CII.) 2004; 53: 786-92.

Traynor, A.M.; Schiller, J.H. "Systemic treatment of advanced non-small cell lung cancer." Drugs Today (Barc) (Drugs of today (Barcelona, Spain : 1998)). 2004; 40(8): 697-710.

Tanno, S.; Ohsaki, Y.; Nakanishi, K.; Toyoshima, E.; Kikuchi, K. "Small cell lung cancer cells express EGFR and tyrosine phosphorylation of EGFR is inhibited by gefitinib ("Iressa", ZD1839)." Oncol Rep (Oncology reports.). 2004; 12(5): 1053-7.

Campione, A.; Ligabue, T.; Luzzi, L.; Ghiribelli, C.; Paladini, P.; Voltolini, L.; Di Bisceglie, M.; Lonzi, M.; Gotti, G. "Impact of size, histology, and gender on stage IA non-small cell lung cancer." Asian Cardiovasc Thorac Ann (Asian cardiovascular & thoracic annals.) 2004; 12(2): 149-53.

Mao, F.; Qian, W.; Gaviria, J.; and Clarke, L.P. "Fragmentary Window Filtering for Multiscale Lung Nodule Detection: Preliminary Study," Academic Radiology. Apr. 1998; 5(4):306-311.

Li, L.; Qian, W.; and Clarke, L.P., "Digital mammography: Computer-assisted Diagnosis Method for Mass Detection with Multiorientation and Multiresolution Wavelet Transforms," Academic Radiology. 1997; 4:724-731.

Qian, W.; Li, L.; and Clarke, L.P.; Mao, F.; Kallergi, M.; Clark, R. A. "Computer Assisted Diagnostic (CAD) Methods for X-ray Imaging and Teleradiology," Proceedings of the 26th AIPR Workshop, Cosmos Club, D.C., Oct. 15-17, 1997.

Sammouda, R.; Niki, N.; and Nishitani, H. A comparison of Hopfield Neural Network and Boltzmann machine in segmenting MR images of the brain. IEEE Trans. Nucl. Sci. 1996; 43(6):1131-35.

Kayser, G.; Radziszowski, D.; Bzdyl, P.; Sommer, R.; Kayser, K. "Theory and implementation of an electronic, automated measurement system for images obtained from immunohistochemically stained slides." Analytical and quantitative cytology and histology. Feb. 2006; 28(1):27-38.

Sobrevilla, P.; Montseny, E.; Keller, J. "Using a Fuzzy Morphological Structural Element for Image Segmentation." 19th International Conference of the North American Fuzzy Information Processing Society—NAFIPS. Atlanta, GA, Jul. 13-15, 2000.

Dulyakarn, P.; Rangsanseri, Y. "Fuzzy C-Means Clustering Using Spatial Information with Application to Remote Sensing." 22nd Asian Conference on Remote Sensing. Singapore, Nov. 5-9, 2001.

Hearst, M. "Support Vector Machines." Trends & Controversies—IEEE Intelligent Systems Magazine. Jul./Aug. 1998;18-28.

PCT Notification of Transmittal of the International Search Report and the Written Opinion of the International Searching Authority, or the Declaration issued Sep. 12, 2008 for corresponding International Application No. PCT/US07/15343.

\* cited by examiner

Labeled and thresholded
distance transform image

Thresholded
smear image

COMPUTER-AIDED PATHOLOGICAL DIAGNOSIS SYSTEM

CROSS-REFERENCE TO RELATED APPLICATIONS

This application claims the benefit of U.S. provisional patent application No. 60/806,372, filed on Jun. 30, 2006, entitled, "Computer-Aided Pathological Diagnosis System".

STATEMENT OF GOVERNMENT INTEREST

This invention was made with Government support under Grant No. PR054405 awarded by the Department of Defense and Grant No. SR33CA099046-01A1 awarded by the National Cancer Institute. The Government thus has certain rights in the invention.

FIELD OF INVENTION

This invention relates to the field of medicine. More specifically, this invention relates a computer-aided pathological diagnosis system designed for biomarker assessment, differentiation of cancer biomarkers and identification of cancer cells in tissue based upon an image of a specimen.

BACKGROUND OF THE INVENTION

Clinical lung cancer diagnosis depends upon the pathologist's interpretation of morphological features of histological and cytological specimens. These interpretations may be assisted by detection of cancer cell related molecules to improve sensitivity and specificity of the diagnostic techniques.

Molecular methods, including application of cancer-specific markers, may prove to be complementary to cytology diagnosis. Quantitative evaluation of lung carcinomas with cytoplasmic markers has been successfully investigated. Imaging technology provides an objective way for the quantitative analysis of tumor cells morphology. Current imaging practices are mostly manual, time-consuming, and tedious, yielding subjective and imprecise results. In order to improve the situation, many methods for computer-aided diagnosis of cell images have been designed. The methods including common commercial tools for computer aided morphologic image analysis utilizing region-based methods and threshold based methods. Region-based methods separate the object from the background by region growing, region splitting, and merging of regions to segment the image. Threshold-based segmentation is a simpler method based on single pixel classification. In threshold-based segmentation, a feature value such as gray level is associated with each pixel and this value is compared to the threshold to classify a pixel as an object or background. Determination of the threshold is critical; a simple method is to select the threshold as determined by a histogram. More sophisticated versions of threshold-based segmentation are also known in the art. The problem with these approaches is that they employ only local (single pixel) information.

Cellular images share the following characteristics:
(1) Poor contrast: Object (cell) gray levels may be close to that of the background.
(2) Many cluttered objects (cells) in a single scene: This high number of occluding objects makes image segmentation difficult.
(3) Low quality: Traditional staining techniques introduce a lot of inhomogeneity into the images, where not all of the parts of the same tissue are equally stained.

Accordingly, what is needed in the art is an improved computer-aided pathological diagnosis system and method for the classification of cancer cells in a tissue specimen that overcomes the deficiencies of the prior art systems and methods.

SUMMARY OF THE INVENTION

In accordance with the present invention is provided, a computer-aided pathological diagnosis method for the classification of cancer cells in a tissue specimen based on a digital cellular image of the tissue specimen. The method of the present invention includes the steps of, extracting the histological characteristic features of the cellular image using preprocessing algorithms having adaptive strategies to enhance the cellular image, declustering the extracted histological characteristic features of the cellular image to isolate the individual cells and the nuclei inside the cells, segmenting the declustered cellular image, labeling the segmented cellular image and classifying the cells in the labeled cellular image as cancer cells or non-cancer cells.

In a specific embodiment of the present invention, the preprocessing algorithms having adaptive strategies are selected from the group of algorithms consisting of adaptive fragmentary window filtering (AFWF), adaptive tree-structured nonlinear filtering (TSF), directional wavelet transform (DWT) and tree-structured wavelet transform (TSWT).

In the present invention, the adaptive fragmentary window filtering (AFWF) algorithm may further include the step of analyzing the edge gradient of all pixels within a predetermined size window of the digital cellular image. Additionally, the predetermined size window is chosen to be at least as large as the smallest cells to be detected.

In an additional embodiment, utilizing the adaptive tree-structured nonlinear filtering (TSF) algorithm may further include the steps of using an adaptive technique for automatic parameter selection for the TSF and employing an adaptive method for selecting the filter window size for the TSF, the filter window size being dependent upon requirements for image detail preservation.

Declustering of the extracted histological characteristic features of the cellular image to isolate the individual cells and the nuclei inside the cells further includes declustering the features of the cellular image using a distance-transform that yields the minimal distance to the boundary of an object for every pixel in the cellular image. In addition, segmenting the declustered cellular image further includes segmenting the declustered cellular image using an unsupervised Hopfield neural network.

The segmented cellular image is then labeled based on chromaticity features and histogram analysis of the RGB color space components of the digital cellular image and, in a particular embodiment, the cells are classified using a Kalman filtering neural network, such as that designed for lung cancer cell diagnosis.

In an additional embodiment, a computer-aided pathological diagnosis system for the classification of cancer cells in a tissue specimen based on a digital cellular image of the tissue specimen is provided including a computer-readable storage device containing a set of instructions that causes a computer to perform the steps of, extracting the histological characteristic features of the cellular image using preprocessing algorithms having adaptive strategies to enhance the cellular image, declustering the extracted histological characteristic features of the cellular image to isolate the individual cells and the nuclei inside the cells, segmenting the declustered cellular image, labeling the segmented cellular image and classifying the cells in the labeled cellular image as cancer cells or non-cancer cells.

The computer-aided cytology diagnosis (CACD) system in accordance with the present invention accurately identifies cell features by adjusting the parameters of CACD modules based on an advanced adaptive strategy and muti-resolution/multi-orientation techniques. These features of the present invention provide for an improved computer-aided pathological diagnosis system and method for the classification of cancer cells in a tissue specimen that overcomes the deficiencies of the prior art systems and methods.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
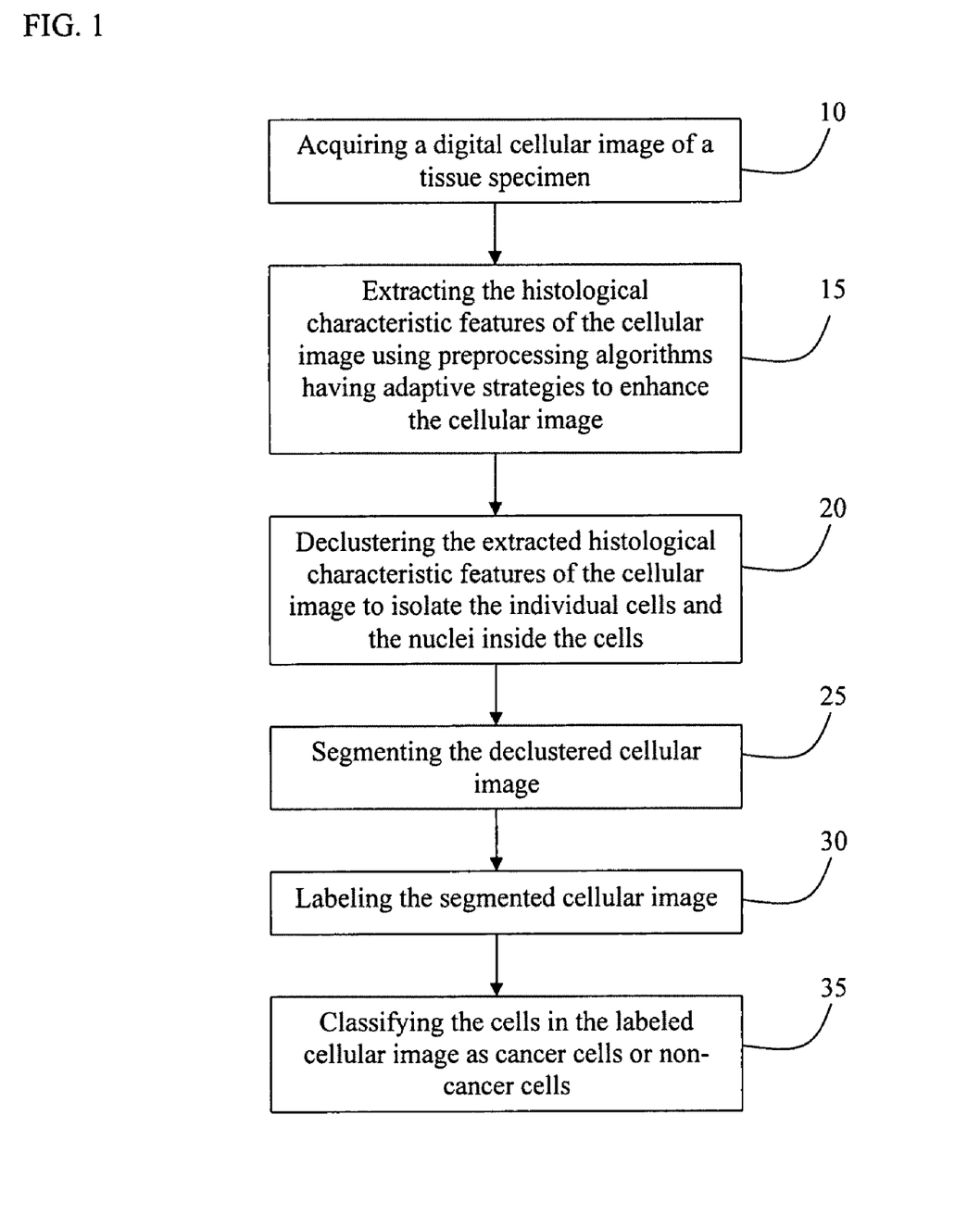
FIG. 1 is a flow diagram illustrating the computer-aided pathological diagnosis method in accordance with the present invention.

With reference to FIG. 1, the present invention is provides a computer-aided pathological diagnosis method for the classification of cancer cells in a tissue specimen based on a digital cellular image of the tissue specimen 10. The method of the present invention includes the steps of, extracting the histological characteristic features of the cellular image using preprocessing algorithms having adaptive strategies to enhance the cellular image 15, declustering the extracted histological characteristic features of the cellular image to isolate the individual cells and the nuclei inside the cells 20, segmenting the declustered cellular image 25, labeling the segmented cellular image 30 and classifying the cells in the labeled cellular image as cancer cells or non-cancer cells 35.

In a particular embodiment, the present invention is a Computer-Aided Pathological Diagnosis (CAPD) system designed for biomarker assessment, to differentiate lung cancer biomarkers and to identify cancer cells in the tissue based on a specimen's images. In accordance with the present invention, a novel APD system is trained to recognize expression of the cancer biomarkers in lung cancer cells. The accuracy of the system of the present invention to distinguish resected lung cancer from pre-neoplastic and normal tissues is also tested. The computer-aided cytological diagnosis (CAPD) system with a set of computerized analysis modules in accordance with an embodiment of the present invention includes:

(1) The adaptive fragmentary window filtering (AFWF) algorithm, tree-structured nonlinear filtering (TSF), directional wavelet transform (DWT), and tree-structured wavelet transform (TSWT) modules which are modified for enhancement.

(2) A fast distance transform designed for de-clustering of cell and nuclear, which is used for isolation of individual cells with clear contours of cell's boundaries, and is also designed to locate and describe the nuclei inside the cell.

(3) An unsupervised Hopfield neural network is designed for segmentation in lung cytological color images, and then, the segmented images are labeled based on chromaticity features and histogram analysis of the RGB color space components of the raw image.

(4) A classification module using Kalman filtering neural networking is designed for cancer cell diagnosis.

Additionally, the performance evaluation and optimization of CAPD system are presented in support of the usefulness of the invention.

The major characteristics of the above modules of the present invention are to adapt detection parameters according to cellular image contents. The novel wavelet transform of the present invention is able to adaptively select different resolution and orientation features based on image content requirements.

The CAPD system in accordance with the present invention provides cellular feature enhancement, segmentation and classification, which are very important in distinguishing the benign lesion from a malignant lesion. The clearly benign lesions usually have smooth nuclear surfaces and exhibit homogeneous chromatin staining intensity. The CAPD system in accordance with the present invention can minimize the rate of false-positive or false-negative diagnosis resulting in better cytology/pathology evaluations and patient management.

It is necessary to train the CACD system of the present invention to assess features of lung cancer cells. In accordance with a particular embodiment of the present invention, the CACD system was trained to assess features of lung cancer cells by evaluating the morphologic features of culture lung cancer cells. In this particular embodiment, the lung adenocarcinoma cell line A549 was obtained from the American Type Culture Collection, Rockville, Md. The other cell lines were established from primary culture of resected lung cancer. Cells were grown in RPMI media supplemented with 10% heat inactivated fetal bovine serum (R10), 1 mM glutamine and antibiotics, and passaged weekly at subconfluence after trypsinisation. RPMI 1640, trypsin and sera were obtained from Mediatech, Inc., Herndon, Va. Cultures were maintained in humidified incubators at 37° C. in an atmosphere of 5% $CO_2$ in air. For morphology and immunohistochemistry studies, adherent cells were trypsinized and then preserved in PreservCyt (CYTYC Corp., Boxborough, Mass.), and fixed cytospin preparations were stained with hematoxylin-eosin and for γ-H2AX staining with PX technique (as described below).

For the immunohistochemistry studies in accordance with this embodiment, formalin fixed, paraffin embedded tissue from adenocarcinoma and squamous cell carcinoma of the lung were obtained from the Moffitt Tissue Procurement Core and cut into 3 μm sections. Standard IHC with antigen retrieval was performed using a primary antibody to γ-H2AX (Rabbit, polyclonal IgG from Upstate Biotechnology, Lake Placid, N.Y.) applied at 1:700 dilution, overnight at 4° C. in a humidity chamber. IHC was completed on the DAKO autostainer using VectorElite—PX Rabbit detection and DAB chromogen.

Defining the differences between normal cells and cancer cells at three levels: (1) histology, (2) individual cell, and (3) nuclear of cells, the computational features and corresponding pathological description can be summarized as shown in Table I.

TABLE I

Difference between Normal Cells and Cancer Cells

| Features | Pathological Description |
| --- | --- |
| Shape: measured by area, curvature, boundary, first and second deviations. | Cancer cells usually have rounded up shape and can maintain their rough spherical surface. |
| Confluence: measured by contrast, affined invariant moments and compactness. | Normal cells usually aligned in the same direction, and highly confluent with only a few gaps between the cells. As far as cancer cells concerned, they always keep division, so when there is no room the cancer cells start to grow on top on one another creating an amorphous cell mass. |
| Size and Amount: measured by area, curvature, boundary, energy and perimeter length over cell. | Normal compares with abnormal in area, curvature, boundary, energy and perimeter length over cell; cancer cells are predominantly small. Cancer cells were often closely related in clusters, suggesting that cell division is occurring. |
| Ratio of N/C: measured by solidity, energy, intensity variation and areas. | Cancer cells have relative bigger ratio of nuclear to cytoplasm than normal cells |
| Inhibition: measured by co-occurrence matrix, similarity, circumference and the sum and difference of histogram | The difference of normal cell and cancer cell; Normal cell won't go on their divisions when they contact each other, but cancer cells keep dividing in all the space they could occupy, then produce a great amount of small, high density, useless cells |

The CACD system in accordance with the present invention includes the following basic stages: (1) preprocessing algorithms using adaptive strategies for AFWF, TSF, DWT and TSWT modules for enhancement of cellular images to get the histological characteristic features, (2) declustering for isolation of cell and nuclei using fast distance-transform to get individual cell characteristic features and the nucleolus features, (3) image segmentation using an unsupervised Hopfield artificial neural network classifier and the labeling of the segmented image based on chromaticity features and histogram analysis of the RGB color space components of the raw image, (4) feature description, extraction and classification to finally identify whether a cell is normal with high confidence, and then to address the cells that are judged as cancer cells with cancer subtype classifications.

In accordance with the present invention, the preprocessing CACD modules are modified using an adaptive strategy. The AFWF is known in the art to detect circular patterns in a digitized radiographic image. In accordance with a particular embodiment of the present invention, the AFWF is modified to detect digital cellular images in a histological section by analyzing the edge gradient of all pixels within a small window. This window is chosen to be at least as large as the smallest cells to be detected. Since the majority of cells display circular geometry, analysis of the edge gradients allows identification of the cells center as the locus of a sufficient (chosen) number of edge gradient vectors. The nodule boundaries are found by employing a circularity template, which is a cross-correlation of the individual normalized vector components. The measuring of locality is used to isolate the nodule by eliminating detected gradient vectors with components that are unequal beyond a chosen threshold. This threshold allows the detection of nodules that depart from strict circularity. Finally, the resulting image is then subjected to a spatial and multi-scale analysis to isolate suspicious areas as local intensity maxims. The circularity is also a useful feature to identify normal and cancer cells. As such, in accordance with the present invention, the AFWF was modified to aid the cytological diagnosis.

In accordance with an embodiment of the present invention, an adaptive TSF module is presented. The advantage of the current tree-structured nonlinear filtering (TSF) for image noise suppression known in the art is that its application does not require a priori knowledge of the local statistics within the filter window; i.e., it is nonadaptive and therefore computationally efficient. Although the TSF has already demonstrated good performance, the present invention employs adaptive methods as an optimization strategy for tree-structured nonlinear filtering. The adaptive methods for TSF in accordance with the present invention include: (1) develop an adaptive technique for automatic parameter selection for the TSF, i.e., parameters $K_1$, $K_2$ and $K_3$ as defined in Equations 7-10 presented in W. Qian, L. P. Clarke, M. Kallergi, R. A. Clark, "Tree-structured nonlinear filters in digital mammography," IEEE Trans. Med. Imag., vol. 13(1), 25-36, 1994, which is incorporated herein by reference, and (2) develop an adaptive method for selecting the filter window sizes (i.e., from 3×3 to 7×7) depending on requirements for image detail preservation. The initial physical performance of the adaptive filter will initially be evaluated by standard signal processing criteria: (1) localized metrics for noise evaluation such as the normalized mean square error (NMSE) and difference images to show structured noise, and (2) inclusion of the effect of the application of the directional wavelet transform (DWT) module to the same simulated images to evaluate possible artifact generation.

In accordance with the present invention, the DWT module has been adapted for optimum perfomance. The DWT module is designed as a bank of wavelet filters implemented by using adaptive combiners with different weight factors as described in more detail in L. Li, W. Qian and L. P. Clarke, "Digital mammography: CAD method for mass detection using multiresolution and multiorientation wavelet. transforms," Academic Radiology, 1997; 4:724-731, which is herein incorporated by reference. As such, the DWT module can be uniquely modified for higher order N directional filters. For example, a higher order wavelet orientation (N=16) was recently implemented, affecting the direction angle $Q_i$, i.e., the directional bandwidth of the wavelet functions to allow more selective extraction of directional features. Further improvements in robustness may be achieved through adaptivity of the weights $W_i$ applied to the directional features, as further detailed in L. Li, W. Qian and L. P. Clarke, "Digital mammography: CAD method for mass detection using multiresolution and multiorientation wavelet. transforms," Academic Radiology, 1997; 4:724-731 and W. Qian, L. P. Clarke, L. Li, et. al., "Computer Assisted Diagnostic (CAD) Methods for X-ray Imaging and Teleradiology," Proceedings of the 26th AIPR Workshop, Cosmos Club, D.C., Oct. 15-17, 1997, which are herein incorporated by reference. The present invention performed an initial evaluation of N=16 and found that it improves preservation of the shape of segmented cell areas. In addition, adaptive criteria for the DWT module are proposed, wherein adaptive selection of N for each pixel point is employed to match these changes. By adaptively selecting N, the sampling problem is potentially improved for detection of morphology of cell shapes. Alternatively, for the higher order N, an improvement in the signal/noise ratio for detection of morphology of cell shapes is evidenced. The range of N, which influences the angular bandwidth frequency and directional sensitivity, is adaptively selected within 4-32, which corresponds to a 45°-5.63° arc width and provides higher sampling and more mathematically rigorous method. The physical performance of the adaptive method in accordance with the present invention is evaluated by using the different cell examples, which contain linear and other structures, to determine if appropriate structures are identified or any artifacts generated.

Figure 2:
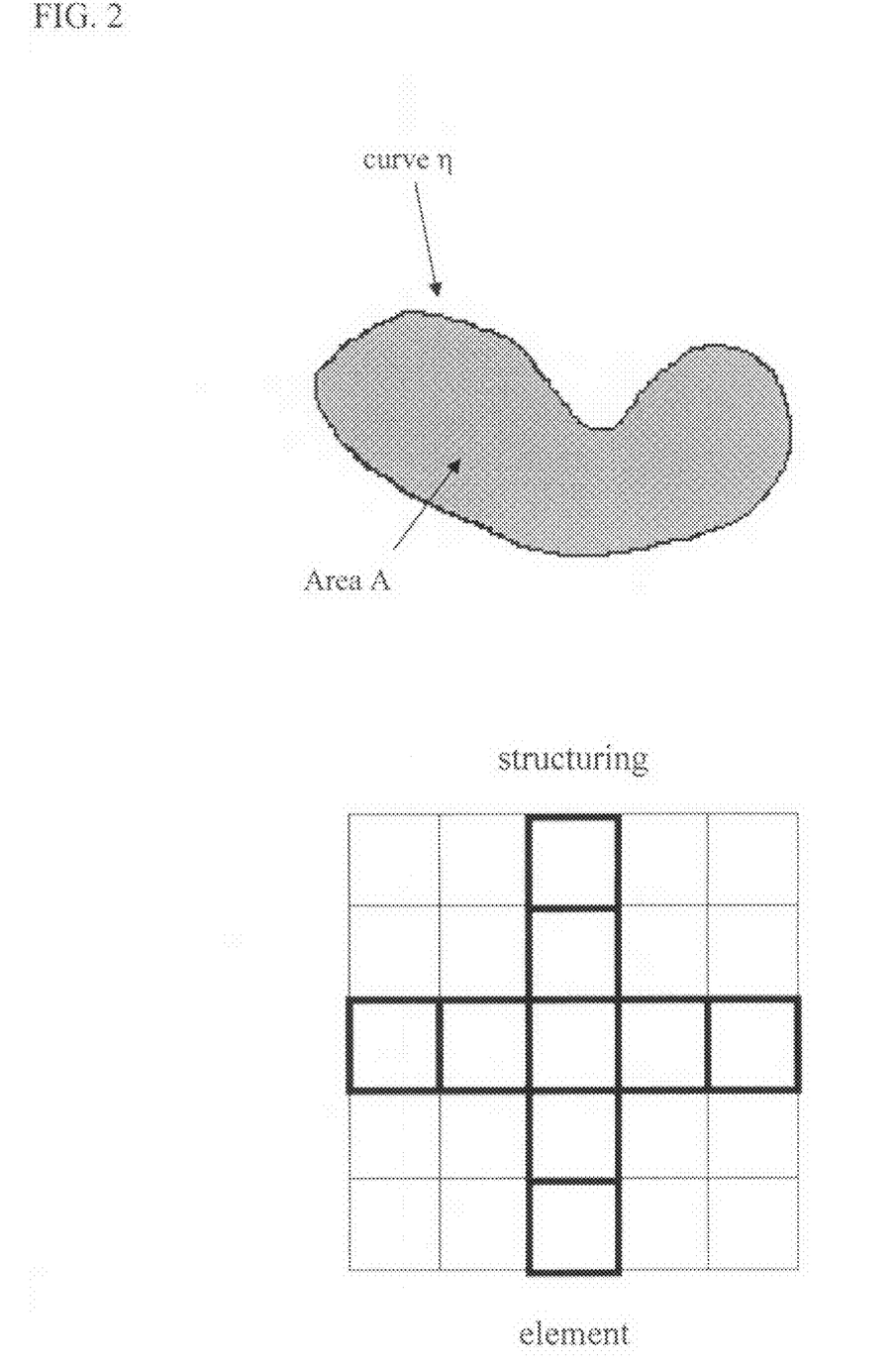
FIG. 2 representation of a fast algorithm for distance transform in accordance with an embodiment of the present invention.
Figure 3:
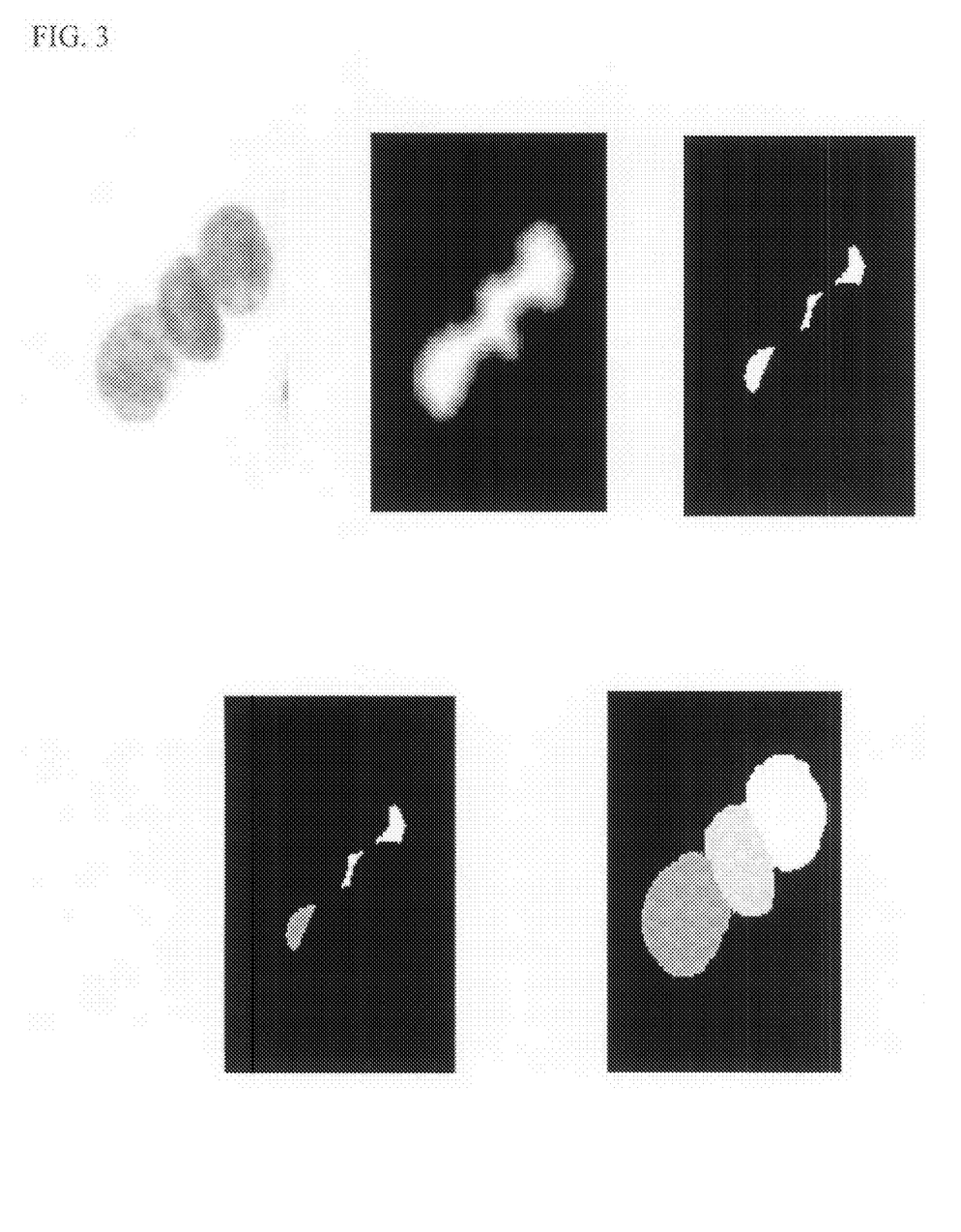
FIG. 3 is a series of five representations of three clustered cells. The images are (from left to right): original image, results from distance transform, threshold over distance transform, labeled threshold, and labeled masks of cells.

The present invention additionally employs declustering for the isolation of touching cells and nuclei. In accordance with an embodiment of the present invention, a newly developed distance-transform is proposed for separating a cluster of cytological cells into individual cells with clear contours of cells' boundaries which also serves to locate and describe the nuclei inside the cells. The distance-transform yields the minimal distance to the boundary of the object for every pixel in the transform's input image I(x; y) as represented in Eq. 1 and shown in FIG. 2.

$$Y(x, y) = \left\{ \min_{V_k} \|(x, y) - \eta(x_k, y_k)\| \right\} \quad (1)$$

with the result of the distance-transform Y(x; y), the coordinate of every pixel x=(x; y) in a uniform area (x; y)∈ A. $\eta(x_k; y_k)$ is the surrounding curve of the area. The distance transform can be approximated using a 5×5 structuring element in an iterative algorithm as shown in FIG. 2. The area A (e.g. a cell cluster) which is obtained as a two-level grey-image is initialized such that pixels x∈ A are assigned the value 1 and background pixels are set to zero. Next, the structuring element given in FIG. 2 is moved over the whole image I(x; y). If all elements in the image below the structuring element take values i(x; y)≧a (with a=1 in the first step) then the point below the center of the structuring element is incremented (on the same image). Finally, a in incremented and the process is repeated. The distance-transformed image is then thresholded as shown with reference to FIG. 3.

Figure 4A:
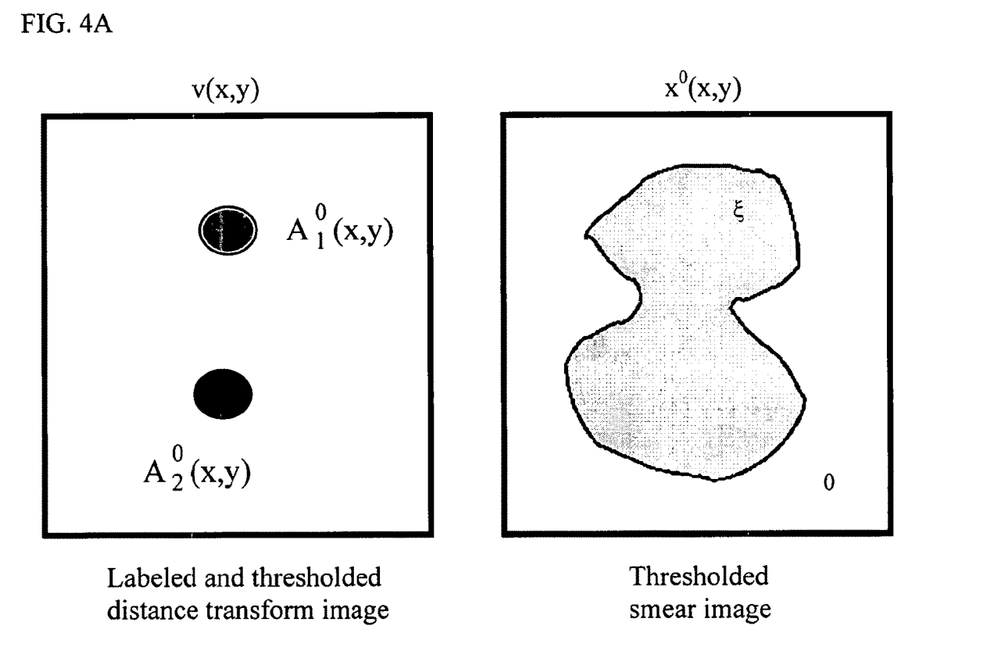
FIG. 4 is a series of representations in which a) is an input preparation for the declustering algorithm and b) is the first iteration of the declustering algorithm in accordance with an embodiment of the invention.
Figure 4B:
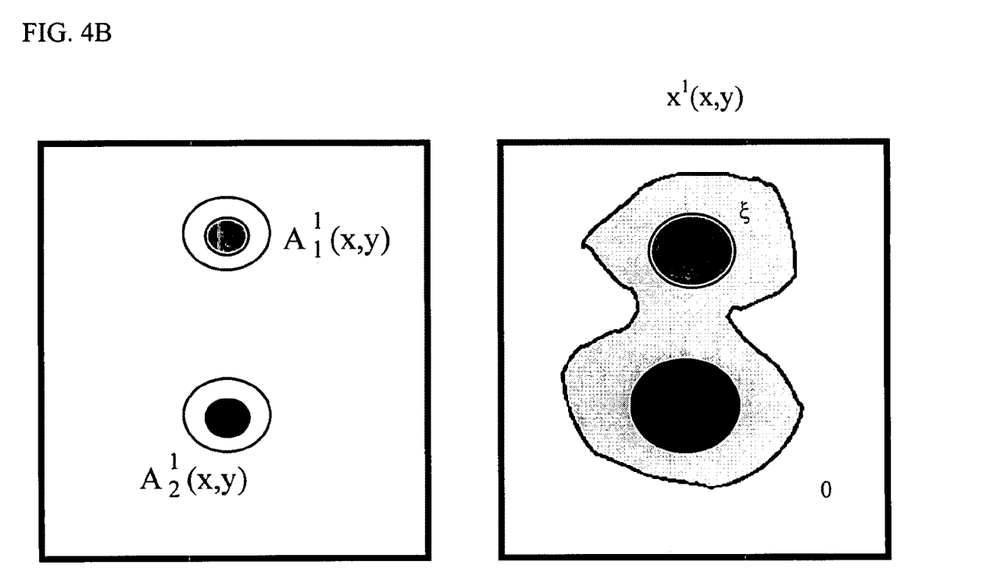

In a particular embodiment, the region growing algorithm is used, which must be controlled by a condition preventing regions from growing into each other (e.g. the regions given in FIG. 3 would grow together without such a condition). To ensure that the region growing stops at the boundary of the cell, we first label the thresholded distance-transform image and label the cluster and background. As such, the area of the clustered object is labeled with a value ξ, and the background is labeled 0. For the initial areas $A_i^0$ we obtain (the subscript denotes the label-index of the area, the superscript gives the iteration step), V(x;y) is the labeled thresholded distance-transformed image as illustrated with reference to FIG. 3 and FIG. 4, which consists of regions denoted by the labels i. X(x;y) is the pre-segmented image:

$$A_i^0(x, y) = (V(x, y) | V(x, y) = i)$$

$$A_i^{k+1}(x,y) = (A_i^k \oplus S) \wedge [(X^k(x,y) = \xi) \vee (X^k(x, y) = i)] \quad (2)$$

The dilation ($A_i^k \oplus S$) is performed w.r.t the areas labeled i. The iteration is stopped if the areas $A_i^k$ comprise the whole cluster. The overlapping viz. ($A_i^k \cap A_j^k$)≠0, j≠i of the areas is avoided using an extended condition for growing (see Eq. (2)) and by introducing results which were already obtained into the source-image X(x; y) as follows (see Eq. (3)):

$$X^{k+1}(x, y) = \bigvee_{i=1}^{N} [(X^k(x, y) | A_i^{k+1}(x, y) = 0) \vee (A_i^{k+1}(x, y) | A_i^{k+1}(x, y) > 0)] \quad (3)$$

The I-th region comprises the whole cell, if $$\sum_{i=0}^{M} [\text{Pixels}(A_i^{k+1})] - \text{Pixels}(X(x, y) > 0) = 0,$$

with Pixels and the pixel counting operator. As the growing speed of the previously described algorithm is not dependent on the initial contour and the initial area is given by the thresholded distance transform, this method provides a fast— and due to the initialization—yet precise solution for declustering cells. The described algorithm can be speeded up by varying the size of the structuring element. i.e. from iteration to iteration the diameter is decreased. In order to ensure a Minimum of Artifacts, the selection of a suitable initial diameter of the structuring element has to be selected.

The present invention employs a neural network for classification and cell diagnosis. In accordance with an embodiment of the present invention, a learning algorithm for back propagation with Kalman filtering is proposed for more efficient training of a neural network for classification. A modified 5-fold cross-validation error estimation technique is proposed, which is a generalization of the leave-one-out technique to achieve reliable system performance and accurate results evaluation, as previously used by our investigators in B. Y. Zheng, W. Qian, L. P. Clarke, "Digital mammography: MF-based NN for automatic detection of microcalcifications," IEEE Trans. on Medical Imaging, pp. 589-597, October 1996, which is incorporated herein by reference. In this embodiment, 5-fold cross validation is run on the data set. More specifically, the data set is divided into five subsets of similar size, where the proportion of different classes in each subset is similar to that in the original data set. Then each experiment is run for five times, each time using the union of four subsets as the training set to train the lung cancer cell identification module named Kalman filtering Neural Network, and using the remaining subset as a test set to test the trained module to see how well it works.

Figure 5:
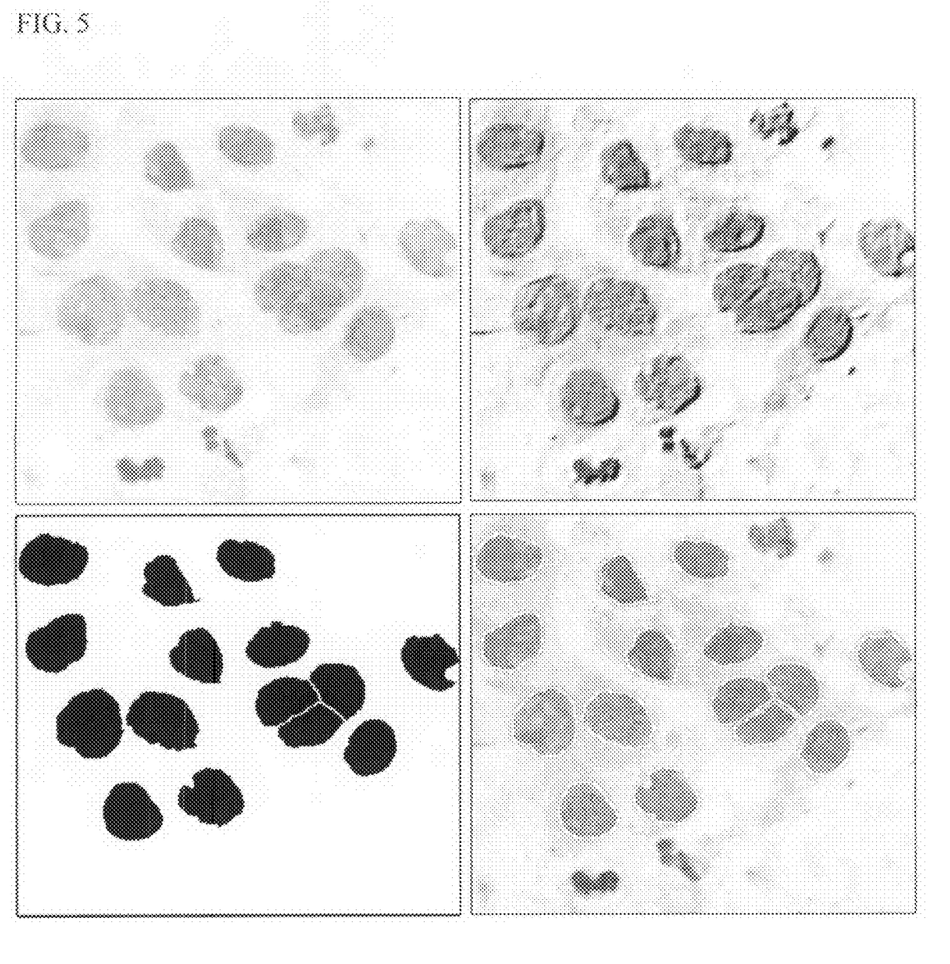
FIG. 5 is a series of four representations of cells. Top left: Original squamous carcinoma cancer cell image. Top right: Enhancement result by using TSF, DWT, WT enhancement modules in CACD in accordance with the present invention. Bottom left: Pre-segmented result by using proposed Hopfield Neural Network described in accordance with the present invention. Bottom right: Result after declustering process by using the algorithm in accordance with the present invention.
Figure 6A:
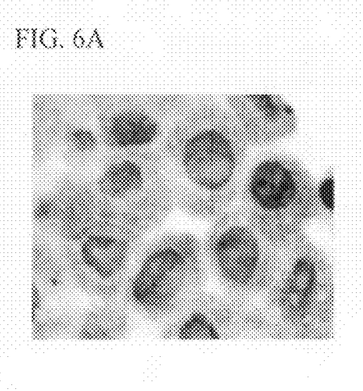
FIG. 6 is a series of representations of cells in accordance with embodiment of the present invention. (a). Original normal cell image, (b). Original cancer cell image, (c). Cell segmentation result of normal cell image, (d) Cell segmentation result of cancer cell image. (e). Segmented nuclei of normal cell image. (f) Segmented nuclei of cancer cell image. (g) Segmented cytoplasm tissues of normal cell image. (h) Segmented cytoplasm tissues of cancer cell image. Microstructure features can be extracted from these images.
Figure 6B:
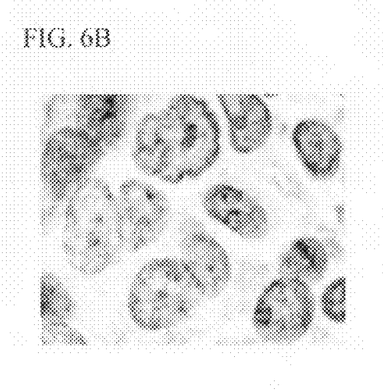
Figure 6C:
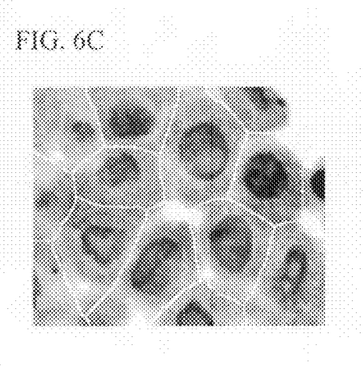
Figure 6D:
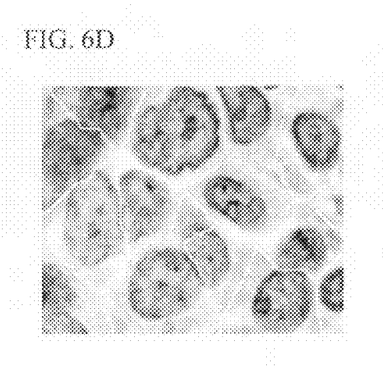
Figure 6E:
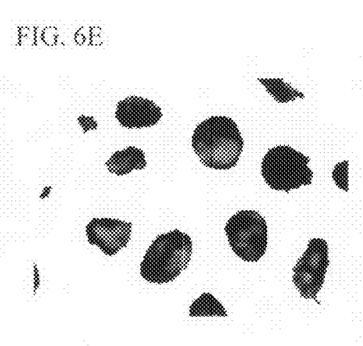
Figure 6F:
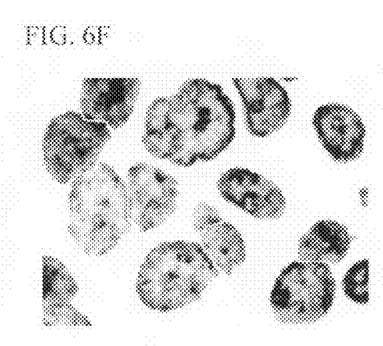
Figure 6G:
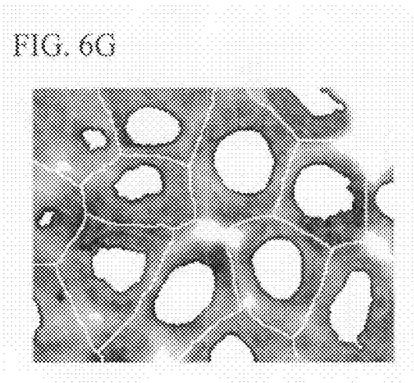
Figure 6H:
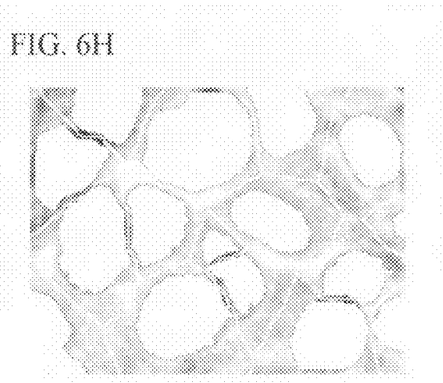

As described above, the cell lines, immunohistochemistry, and corresponding cell computational features are used and implemented in accordance with the present invention. In an exemplary embodiment, the different module algorithms in the CACD system as previously described are applied to the examples of the cellular images shown in FIG. 5 and FIG. 6.

Figure 7A:
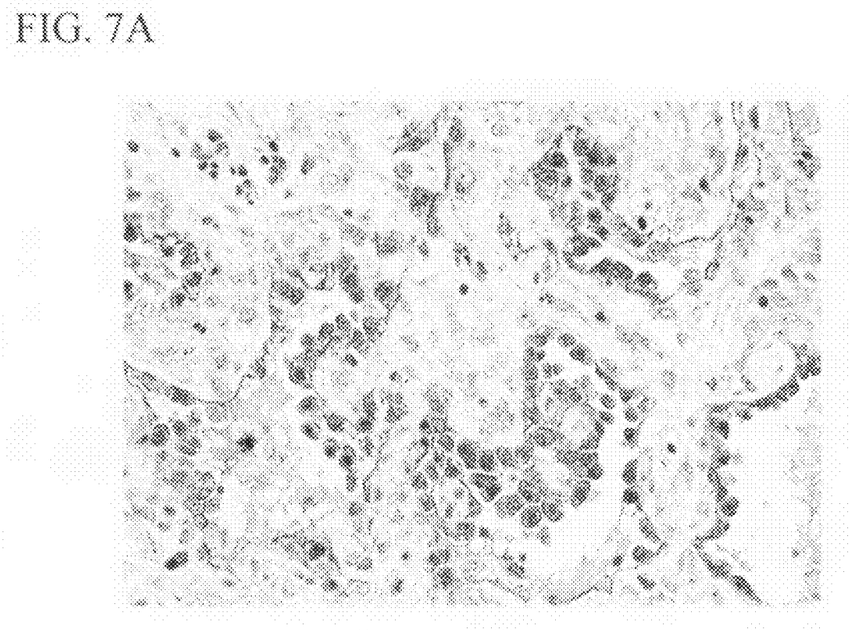
FIG. 7 is a pair of photographs. (A)—Adenoca of the lung; (B)—AAH lesion in adjacent to tumor tissue.γ-H2AX staining, PX-DAB (brown), hematoxylin (blue) counterstain, 40X.
Figure 7B:
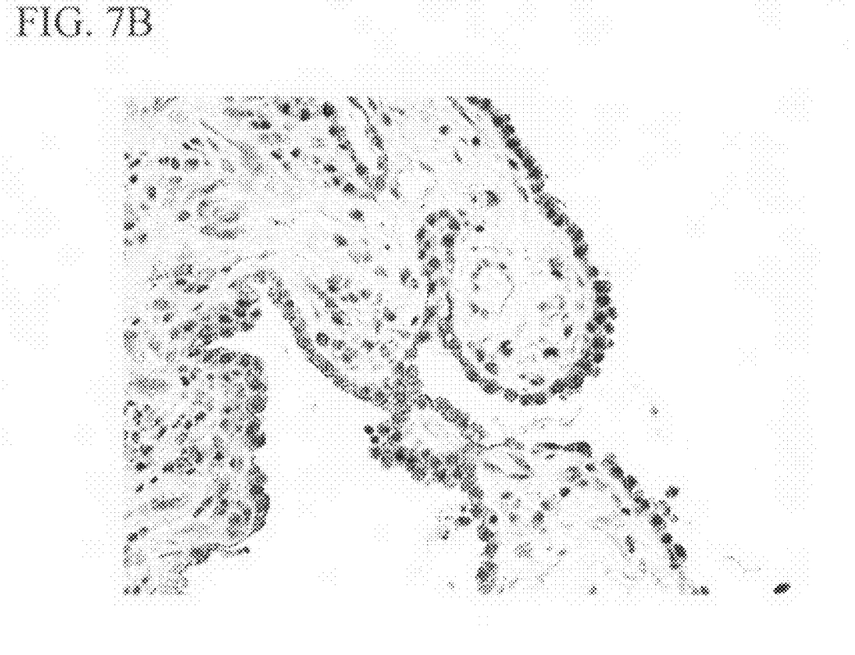
Figure 8A:
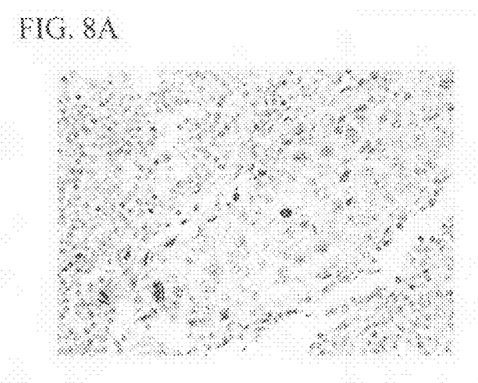
FIG. 8 is a series of photographs. Fig. A. Raw image of lung tissue-Sq.cell Ca, γ-H2AX, PX-DAB, 40X; Fig. B Enhanced and segmented cell image; Fig. C Enhanced and segmented nuclei image; Fig. D Enhanced and segmented cytoplasm image.
Figure 8B:
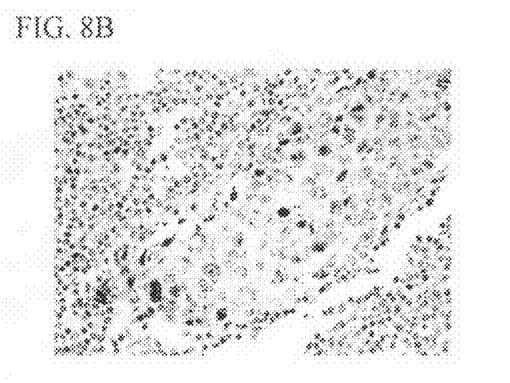
Figure 8C:
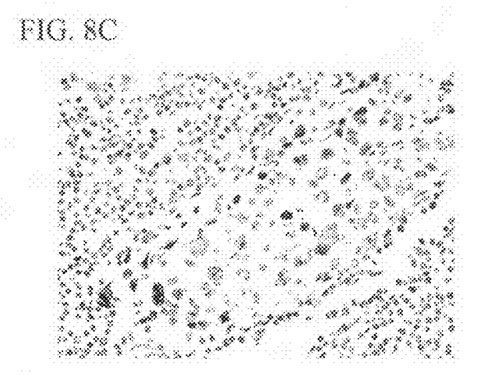
Figure 8D:
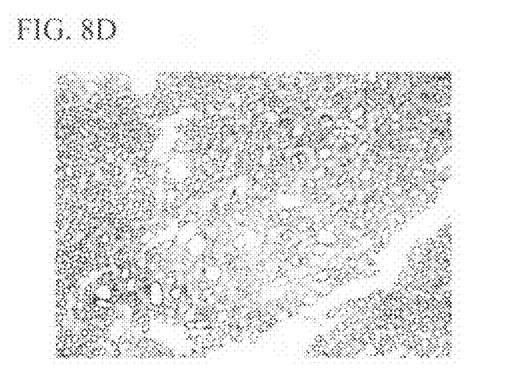

With reference to FIGS. 7A and 7B, with bright field microscopy predominately nuclear staining is observed in Squamous cell carcinoma, and nuclear plus cytoplasmic staining in Adenocarcinoma. Of great interest is the strong nuclear antigen expression in cells from an AAH lesion (potentially pre-malignant lesion of the lung) with no detectable γ-H2AX staining in morphologically normal adjacent tissue. The images in FIGS. 7A and 7B were obtained with the assistance of the Moffitt Analytic Microscopy Core Facility with the use of Leica DMLB light microscope.

In a particular embodiment, for the initial assessment of biomarker expression with the use of standard immunohisto/cyto-chemistry, labeling techniques were applied with visible chromogens and bright field microscopy, to allow the comparison between different image analysis systems including those routinely used in the prior art techniques employed at the Analytic Microscopy Core Facility at the Moffitt Research Institute and the novel CACD system in accordance with the present invention. The software used in the prior art analysis is Spot Advanced (Diagnostic Instruments) ImagePro Plus, version 5.0 to measure color intensities, where the Dynamic Range Density function utilizes to measure the color intensity (units for Dynamic Range run from 255-white to 0-Black). This function provides the ability to quantitate the mean, min, and max dynamic range.

To illustrate the ability of the CACD algorithm in accordance with the present invention to provide mathematical means of histo/cyto-tags for biomarker assessment, first images of lung cancer tissue sections were immunostained for γ-H2AX. As shown in FIG. 8, A-D, the CACD system in accordance with the present invention can be applied to extract mean marker expression values for separate features. Results indicate an elevated expression of γ-H2AX in lung cancer cells when compared to adjacent normal tissue.

Figure 9A:
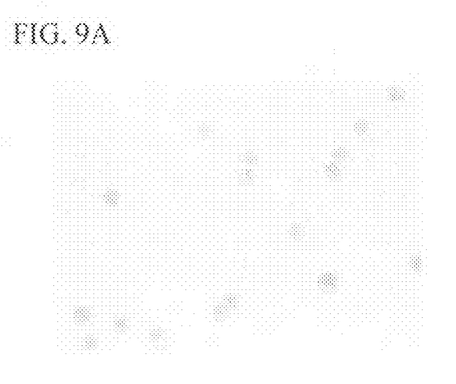
FIG. 9 is a series of three photographs of A549 Lung Carcinoma Cells and patterns of γ-H2AX antibody staining with (a) Negative control; (b) 1:200 anti-γ-H2AX Ab; (c) 1:5000 anti-γ-H2AX Ab
Figure 9B:
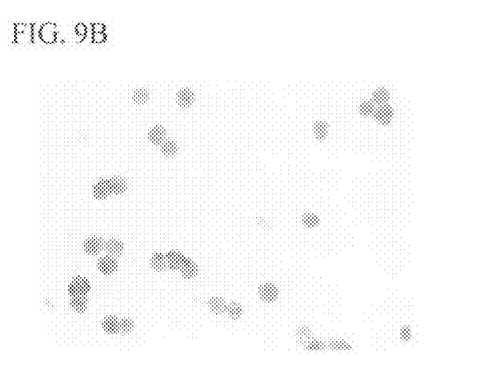
Figure 9C:
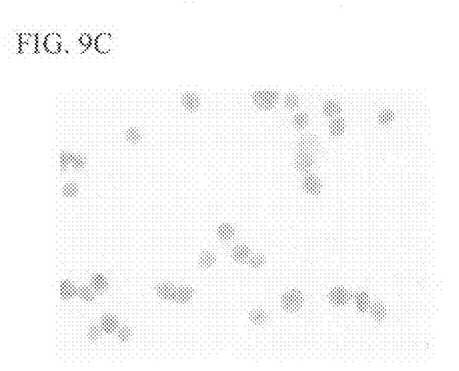

With reference to FIG. 9, in another serial experiment, the ability of the CACD algorithm of the present invention to provide mathematical means for biomarker assessment (γ-H2AX) on images of immunostained cytospin preparations of cultured non-small cell lung adenocarcinoma cell line A549 shown expression at different dilution of γ-H2AX rabbit antibody (Upstate Biotechnology, Lake Placid, N.Y.). PX-DAB, 40X.

In a specific embodiment, the cell images are from microscopy imaging by magnification ×400 and 100 cell images were used for the database to train and test the CACD system of the present invention. In this embodiment, the 100 cell images include 20 cell with γ-H2AX markers, 15 cells with MAGE proteins markers, 18 cell with phosphor-STAT3 markers, and 47 normal cells without cancer markers. The CACD system was used to calculate the representative cancer marker related features based on the 100 cell images. In the training process, half of the 100 cell images were randomly selected as the training set, and the internal parameters, including the connection weights and unit thresholds in the algorithm modules of the CACD system are to be adjusted iteratively. In an additional embodiment, a learning algorithm for back propagation with Kalman filtering is proposed for more efficient training.

The data presented in Table II shows the ability of the CACD system in accordance with the present invention to provide multiple cell feature extraction. There are twelve features computed by the CACD system in Table II. These features are sufficient on classification of cancer versus normal tissues, especially the ability to separate signals from nuclei and cytoplasm and prove sub-cellular localization of the targeted cancer-specific biomarkers.

TABLE II

| Feature | Area | Convex Area | Equiv. Diam. | Convex Perim. | Skelet. Length | Mean Red | Mean Green | Mean Blue | Mean Hue | Mean Satur | Mean Lumi | Inten. Stdv |
|---|---|---|---|---|---|---|---|---|---|---|---|---|
| Adeno 2005 pH2AX 40x_Nuclei | | | | | | | | | | | | |
| Average | 0.118 | 0.131 | 0.362 | 1.29 | 0.561 | 139 | 119 | 124 | 190 | 26.6 | 127 | 19 |
| STDV | 0.096 | 0.106 | 0.14 | 0.492 | 0.315 | 12.7 | 10.9 | 15.2 | 153 | 7.64 | 10.5 | 5.01 |
| Adeno AAH 2005 pH2AX 40x_Nuclei | | | | | | | | | | | | |
| Average | 0.098 | 0.107 | 0.337 | 1.19 | 0.47 | 61.8 | 44.1 | 83.8 | 275 | 84.6 | 63.2 | 22.9 |
| STDV | 0.067 | 0.074 | 0.107 | 0.383 | 0.211 | 19.5 | 15.4 | 23.3 | 27.7 | 29 | 16.1 | 6.27 |
| Adeno NBrochEpi 2005 pH2AX_Nuclei | | | | | | | | | | | | |
| Average | 0.055 | 0.062 | 0.256 | 0.928 | 0.374 | 126 | 113 | 129 | 211 | 29.6 | 123 | 17.6 |
| STDV | 0.033 | 0.038 | 0.069 | 0.253 | 0.172 | 20 | 15.1 | 18.7 | 120 | 10.1 | 14.4 | 4.37 |

In Table II, the results are based on three different cell images: normal (Adeno NBrochEpi 2005 pH2AX_Nuclei), pre-malignant lesion (Adeno AAH 2005 pH2AX 40x_Nuclei), and cancer (Adeno 2005 pH2AX 40x_Nuclei). The results are the test of the feasibility of using the CACD system of the present invention to identify nuclear features for differentiating the three kinds of cells. From this table, we can see that all the selected features are differentiable (there are distinct differences among the feature measurements of different kind of cells). As such, the CACD system in accordance with the present invention provides an improved system and method to identify different kinds of cells.

The CACD system of the present invention provides for cellular feature enhancement, segmentation and classification, which are very useful in distinguishing a benign lesion from a malignant lesion. The clearly benign lesions usually have smooth nuclear surface and homogeneous chromatin staining intensity. In contrast, carcinomas displayed remarkably different features in morphology, including: irregular nuclear surface; marked nuclear pleomorphism (irregular, angulated and indented shape of nuclear volume); irregular and coarse chromatin texture and chaotic arrangement of tumor cell nuclei. In conclusion, nuclear structure with morphologic image analysis by using the CACD system of the present invention provides a useful research diagnostic tool in cytology. Additionally, in clinical practice, the dense hyperchromatic cell groups are considered common diagnostic problems in cytopathological evaluations. Cytological evaluations of the dense hyperchromatic groups in cervicovaginal smear outcome high rates of false-positive or false negative diagnosis. The key element is to automatically differentiate among the dense hyperchromatic groups and to appropriately classify, based on strict morphologic criteria. As such, the CACD system of the present invention is a useful tool to be employed for the diagnosis of dense hyperchromatic cell groups.

The automatic extraction of the cancerous nuclei and assess biomarker expression on sub-cellular level in lung pathological color images can segment the images based on chromaticity features and histogram analysis of the RGB color space components of the raw image. The ideal cytomorphometric analysis should differentiate between the ambiguous or suspicious groups of dense hyperchromatic cells. Ultimately, the CACD system of the present invention can minimize the rate of false-positive or false-negative diagnosis resulting in better cytology/pathology evaluations and patient management.

REFERENCES

Dillon, D. A., et al. "The Molecular Biology of Breast Cancer: Accelerating Clinical Applications." Critical Reviews in Oncogenesis 9.2 (1998):125-140.

Burma, S., Chen, B. P., Murphy, M., Kurimasa, A. & Chen, D. J. "ATM phosphorylates histone H2AX in response to DNA double-strand breaks". J. Biol. Chem, 276: 42462-42467, 2001.

Ward, I. M. & Chen, J. "Histone H2AX is phosphorylated in an ATR-dependent manner in response to replicational stress." J. Biol. Chem. 276, 47759-47762, 2001.

Sedelnikova O A, Pitch D R, Redon C, Bonner W M. "Histone H2AX in DNA damage and repair." Cancer Biol Ther 2(3):233-235, 2003.

K. Kayser, G. Kayser, N. V. Bovin, H.-J. Gabius "Quantitative evaluation of ligandohistochemistry with cytoplasmatic markers: program structure and application to lung carcinomas." Electronic journal of pathology and histology. 1995;1(4)

Garrido A, Perez N. "Applying deformable templates for cell image segmentation." Pattern Recognit 2000; 33:821-32.

Mouroutis T, Roberts S J, Bharath A A. "Robust cell nuclei segmentation using statistical modeling." Bio. Imaging 1998; 6:79-91.

Simon I, Pound C R, Partin A W, Clemens J Q, Christensbarry W A. "Automated image analysis system for detecting boundaries of live prostate cancer cells." Cytometry 1998; 31:287-94.

Wu H S, Barba J, Gil J. "A parametric fitting algorithm for segmentation of cell images." IEEE Trans Biomed Eng 1998; 45:400-7.

Wu H S, Barba J, Gil J. "Iterative thresholding for segmentation of cells from noisy images." J Microsc 2000; 197:296-304.

Kapur J N, Sahoo P K, Wong A K C. "A new method for gray-level picture thresholding using the entropy of the histogram." Comput Vis Graph Image Process 1985; 29:273-85.

Kittler J, Illingworth J. "Minimum error thresholding." Pattern Recognit 1986;19:41-.

Hamasaki M, Kamma H, Wu W, and others. "Expression of hnRNP B1 in four major histological types of lung cancers." Anticancer Res. 2001; 21(2A): 979-84

Theocharis S, Kanelli H, Politi E, and others. "Expression of peroxisome proliferator activated receptor-gamma in non-small cell lung carcinoma: correlation with histological type and grade." Lung Cancer (Lung cancer (Amsterdam, Netherlands)) 2002; 36(3): 249-55

Zhou Z H; Jiang Y; Yang Y B, and others. "Lung cancer cell identification based on artificial neural network ensembles." Artif Intell Med (Artificial intelligence in medicine.) 2002; 24(1): 25-36

Yamaji H; Iizasa T; Koh E, and others. "Source *Correlation between interleukin 6 production and tumor proliferation in non-small cell lung cancer*." Cancer Immunol Immunother (Cancer immunology, immunotherapy: CII.) 2004; 53(9): 786-92.

Traynor A M; Schiller J H. "Systemic treatment of advanced non-small cell lung cancer." Drugs Today (Barc) (Drugs of today (Barcelona, Spain: 1998)). 2004; 40(8): 697-710.

Tanno S; Ohsaki Y; Nakanishi K, and others. "*Small cell lung cancer cells express EGFR and tyrosine phosphorylation of EGFR is inhibited by gefitinib ("Iressa", ZD1839)*." Oncol Rep (Oncology reports.). 2004; 12(5): 1053-7.

Bergqvist M; Brattström D; Larsson A, and others. "*The role of circulating anti-p53 antibodies in patients with advanced non-small cell lung cancer and their correlation to clinical parameters and survival*." BMC Cancer (BMC cancer [electronic resource].) 2004; 4(1): 66.

Campione A; Ligabue T; Luzzi L, and others. "*Impact of size, histology, and gender on stage IA non-small cell lung cancer*." Asian Cardiovasc Thorac Ann (Asian cardiovascular & thoracic annals.) 2004; 12(2): 149-53

Mao, F., Qian, W., Gaviria, J. and Clarke, L P. "Fragmentary Window Filtering for Multiscale Lung Nodule Detection: Preliminary Study," Academic Radiology, Vol. 5, No. 4, April 1998, pp 306-311.

W. Qian, L. P. Clarke, M. Kallergi, R. A. Clark, "Tree-structured nonlinear filters in digital mammography," IEEE Trans. Med. Imag., vol. 13(1), 25-36, 1994.

L. Li, W. Qian and L.P. Clarke, "Digital mammography: CAD method for mass detection using multiresolution and multiorientation wavelet. transforms," Academic Radiology, 1997; 4:724-731.

W. Qian, L. P. Clarke, L. Li, et. al., "Computer Assisted Diagnostic (CAD) Methods for X-ray Imaging and Teleradiology," Proceedings of the 26th AIPR Workshop, Cosmos Club, D.C., Oct. 15-17, 1997.

W. Qian, M. Kallergi and L. P. Clarke "Order Statistic-Neural Network Hybrid Filters for Gamma Camera Image Restoration." IEEE Trans. in Medical Imaging, pp 56-65, March, 1993.

W. Qian, L. P. Clarke, "Wavelet-based neural network with fuzzy-logic adaptivity for nuclear image restoration," Proceedings of the IEEE, Special Issue on Applications of Neural Networks, Invited paper, vol. 84, no. 10, 1996.

[27] R. Sammouda, N. Niki and H. Nishitani, A comparison of Hopfield Neural Network and Boltzmann machine in segmenting MR images of the brain. IEEE Trans. Nucl. Sci. 43 6 (1996).

B. Y. Zheng, W. Qian, L. P. Clarke, "Digital mammography: MF-based NN for automatic detection of microcalcifications," IEEE Trans. on Medical Imaging, pp. 589-597, October 1996.

Kayser, Gian; Radziszowski, Dominik; Bzdyl, Piotr; Sommer, Rainer; Kayser, Klaus "Theory and implementation of an electronic, automated measurement system for images obtained from immunohistochemically stained slides." Analytical and quantitative cytology and histology, 2006 February, 28(1):27-38.

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computer-aided pathological diagnosis method for the classification of cancer cells in a tissue specimen based on a digital cellular image of the tissue specimen, the method comprising the steps of:
   extracting the histological characteristic features of the cellular image using preprocessing algorithms having adaptive strategies to enhance the cellular image;
   declustering the cellular image to isolate the individual cells and the nuclei inside the cells using a distance-transform that yields the minimal distance to the boundary of an object for every pixel in the cellular image, wherein the distance-transform is given by $$Y(x, y) = \left\{ \begin{array}{c} \min\|(x, y) - \eta(x_k, y_k)\| \\ Vk \end{array} \right\},$$

where the coordinate of every pixel x=(x;y) in a uniform area (x;y)∈ A and η($x_k$;$y_k$) is the surrounding curve of the area;
   segmenting the declustered cellular image;
   labeling the segmented cellular image; and
   classifying the cells in the labeled cellular image as cancer cells or non-cancer cells.

2. The method of claim 1, wherein the preprocessing algorithms having adaptive strategies are selected from the group of algorithms consisting of adaptive fragmentary window filtering (AFWF), adaptive tree-structured nonlinear filtering (ATSF), directional wavelet transform (DWT) and tree-structured wavelet transform (TSWT).

3. The method of claim 2, AFWF further comprises the step of analyzing the edge gradient of all pixels within a predetermined size window of the digital cellular image.

4. The method of claim 3, wherein the predetermined size window is chosen to be at least as large as the smallest cells to be detected.

5. The method of claim 2, wherein ATSF further comprises the steps of:
   employing an adaptive technique for automatic parameter selection for ATSF; and
   employing an adaptive method for selecting the filter window size for ATSF, the filter window size being dependent upon requirements for image detail preservation.

6. The method of claim 1, wherein the step of segmenting the declustered cellular image further comprises segmenting the declustered cellular image using an unsupervised Hopfield neural network.

7. The method of claim 1, wherein the step of labeling the segmented cellular image further comprises labeling the image based on chromaticity features and histogram analysis of the RGB color space components of the digital cellular image.

8. The method of claim 1, wherein the step of classifying the cells in the labeled cellular image further comprises classifying the cells using a Kalman filtering neural network.

9. The method of claim 8, wherein the Kalman filtering neural network is designed for lung cancer cell diagnosis.

10. A computer-aided pathological diagnosis system for the classification of cancer cells in a tissue specimen based on a digital cellular image of the tissue specimen, the system comprising:
   a computer-readable storage device containing a set of instructions that causes a computer to perform the steps of:
      extracting the histological characteristic features of the cellular image using preprocessing algorithms having adaptive strategies to enhance the cellular image;
   declustering the cellular image to isolate the individual cells and the nuclei inside the cells using a distance-transform that yields the minimal distance to the boundary of an object for every pixel in the cellular image, wherein the distance-transform is given by $$Y(x, y) = \left\{ \begin{array}{c} \min\|(x, y) - \eta(x_k, y_k)\| \\ Vk \end{array} \right\},$$

where the coordinate of every pixel x=(x;y) in a uniform area (x;y)∈ A and η($x_k$;$y_k$) is the surrounding curve of the area;
   segmenting the declustered cellular image;
   labeling the segmented cellular image; and
   classifying the cells in the labeled cellular image as cancer cells or non-cancer cells.

11. The system of claim 10, wherein the preprocessing algorithms having adaptive strategies are selected from the group of algorithms consisting of adaptive fragmentary window filtering (AFWF), adaptive tree-structured nonlinear filtering (ATSF), directional wavelet transform (DWT) and tree-structured wavelet transform (TSWT).

12. The system of claim 11, wherein AFWF further comprises the step of analyzing the edge gradient of all pixels within a predetermined size window of the digital cellular image.

13. The system of claim 12, wherein the predetermined size window is chosen to be at least as large as the smallest cells to be detected.

14. The system of claim 11, wherein ATSF further comprises the steps of:
   employing an adaptive technique for automatic parameter selection for ATSF; and
   employing an adaptive method for selecting the filter window size for ATSF, the filter window size being dependent upon requirements for image detail preservation.

15. The system of claim 10, wherein the step of segmenting the declustered cellular image further comprises segmenting the declustered cellular image using an unsupervised Hopfield neural network.

16. The system of claim 10, wherein the step of labeling the segmented cellular image further comprises labeling the image based on chromaticity features and histogram analysis of the RGB color space components of the digital cellular image.

17. The system of claim 10, wherein the step of classifying the cells in the labeled cellular image further comprises classifying the cells using a Kalman filtering neural network.

18. The system of claim 17, wherein the Kalman filtering neural network is designed for lung cancer cell diagnosis.

19. The method of claim 1, wherein the preprocessing algorithms having adaptive strategies include adaptive fragmentary window filtering (AFWF).

20. The method of claim 19, wherein AFWF further comprises the steps of:
- analyzing the edge gradient of all pixels within a predetermined size window of the digital cellular image to provide identification of the cell's center as the locus of a predetermined number of edge gradient vectors;
- employing a cross-correlation of a plurality of normalized vector components to locate a nodule's boundary;
- isolating the nodule by eliminating the detected gradient vectors having components that are unequal beyond a predetermined threshold;
- isolating suspicious areas as local intensity maximums using spatial and multi-scale analysis; and
- analyzing the edge gradient of all pixels within a predetermined size window of the digital cellular image.

21. The method of claim 20, wherein the predetermined size window is chosen to be at least as large as the smallest cells to be detected.

22. The method of claim 1, wherein the preprocessing algorithms having adaptive strategies include adaptive tree-structured nonlinear filtering (ATSF).

23. The method of claim 22, wherein ATSF further comprises the steps of:
- employing an adaptive technique for automatic parameter selection for ATSF; and
- employing an adaptive method for selecting the filter window size for ATSF, the filter window size being dependent upon requirements for image detail preservation.

24. The system of claim 10, wherein the preprocessing algorithms having adaptive strategies include adaptive fragmentary window filtering (AFWF).

25. The system of claim 24, wherein AFWF further comprises the steps of:
- analyzing the edge gradient of all pixels within a predetermined size window of the digital cellular image to provide identification of the cell's center as the locus of a predetermined number of edge gradient vectors;
- employing a cross-correlation of a plurality of normalized vector components to locate a nodule's boundary;
- isolating the nodule by eliminating the detected gradient vectors having components that are unequal beyond a predetermined threshold;
- isolating suspicious areas as local intensity maximums using spatial and multi-scale analysis; and
- analyzing the edge gradient of all pixels within a predetermined size window of the digital cellular image.

26. The system of claim 25, wherein the predetermined size window is chosen to be at least as large as the smallest cells to be detected.

27. The system of claim 10, wherein the preprocessing algorithms having adaptive strategies include adaptive tree-structured nonlinear filtering (ATSF).

28. The system of claim 27, wherein ATSF further comprises the steps of:
- employing an adaptive technique for automatic parameter selection for ATSF; and
- employing an adaptive method for selecting the filter window size for ATSF, the filter window size being dependent upon requirements for image detail preservation.

\* \* \* \* \*